Feb. 22, 1938.  B. C. PLACE  2,109,402
CARPET FASTENER
Filed May 12, 1934  2 Sheets-Sheet 1
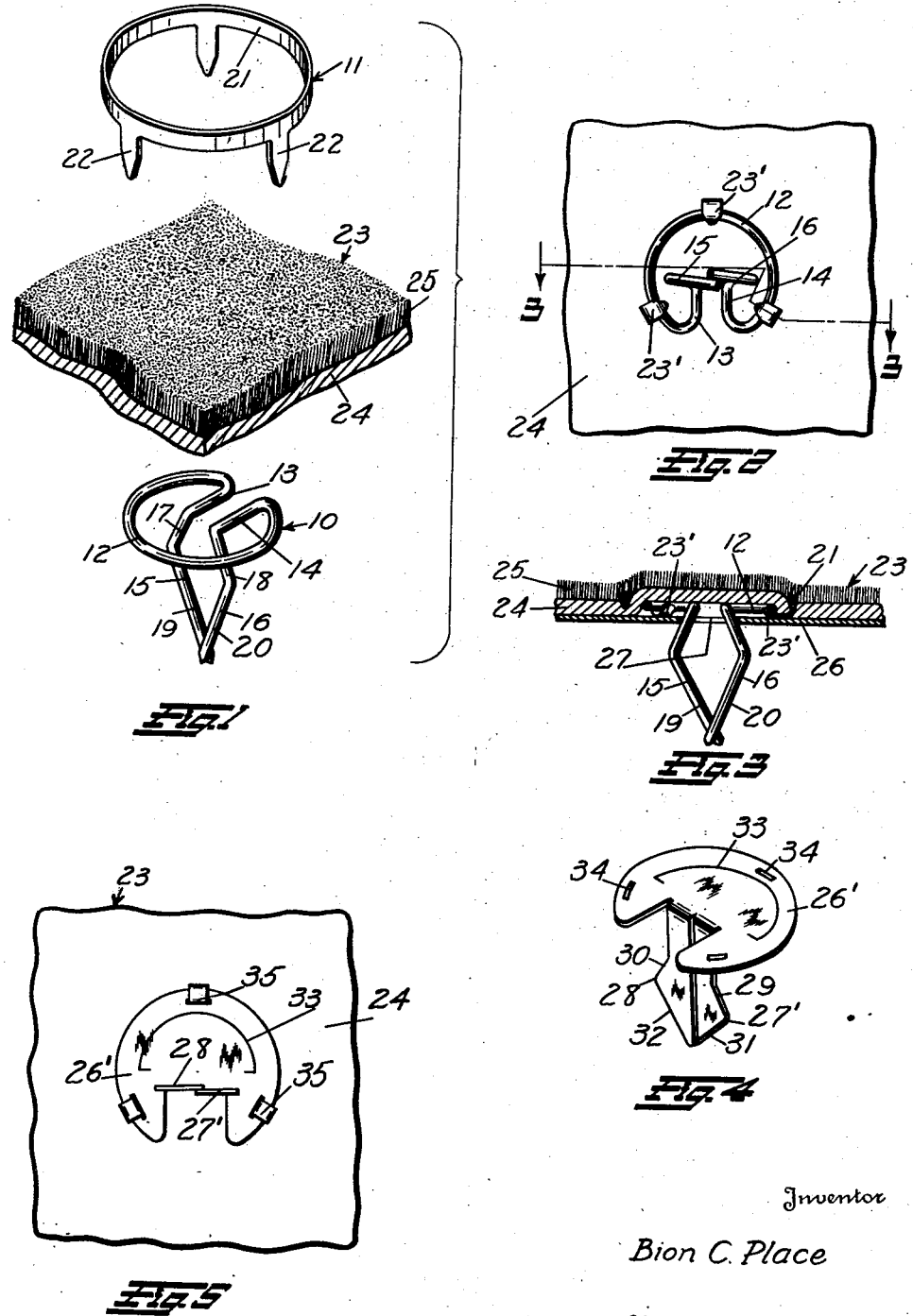
Inventor
Bion C. Place
By Strauch & Hoffman
Attorneys Feb. 22, 1938.                B. C. PLACE                2,109,402
                            CARPET FASTENER
                          Filed May 12, 1934            2 Sheets-Sheet 2
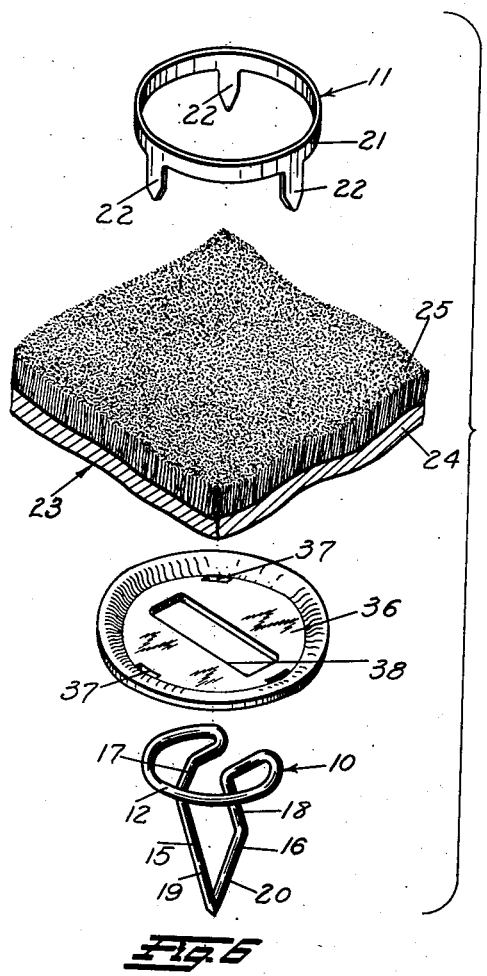
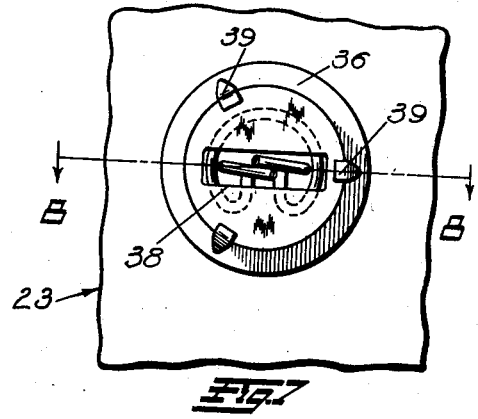
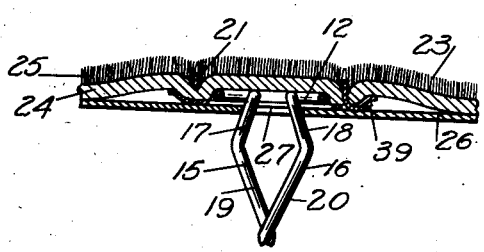
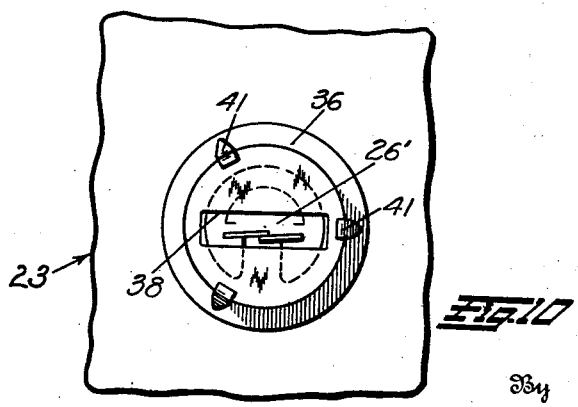
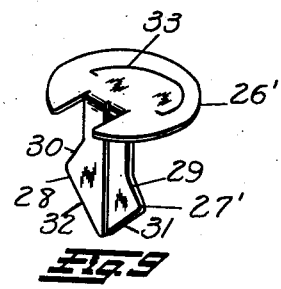
Inventor
Bion C. Place
By Strauch + Hoffman
Attorneys Patented Feb. 22, 1938

2,109,402

UNITED STATES PATENT OFFICE 2,109,402

CARPET FASTENER

Bion C. Place, Detroit, Mich., assignor of one-half to George E. Gagnier, Detroit, Mich.

Application May 12, 1934, Serial No. 725,365

6 Claims. (Cl. 24—213)

This invention relates to carpet fasteners intended particularly for securing the rugs to the floors of automobile or similar vehicle bodies, though the fastener of the present invention is capable of use for securing carpets to any floors. More particularly, the invention is concerned with snap or spring fastening means for carpets or rugs.

Carpet fasteners of the snap or spring type heretofore proposed generally consist of several parts, attached to the floor and carpet respectively, intended to be brought into snapped engagement in securing the carpet or rug on the floor. Such arrangements are not entirely satisfactory because of the necessary thickness of the several parts which results in a protuberance or projection in the rug at the points at which the fasteners are applied.

Furthermore, because of the necessity of minimizing the thickness of the assembled fastener the stud part of the snap fastener is generally made short, and this limitation as to the length of the stud necessitates the formation of short, relatively sharp holding shoulders on the stud. A shallow socket part is needed to receive the stud part and in normal use dirt or grit accumulates in such socket particularly in the corners thereof, preventing complete insertion of the stud part and a bringing about of a proper engagement of the holding shoulder on the stud with the wall of the socket.

The present invention has for its primary purpose the securing of rugs or carpets to the floors of automobiles or similar bodies by a snap fastener stud the length of which is relatively great, and in which relatively long inclined holding shoulders are provided that will exert a proper holding function under conditions encountered in the actual use of the invention.

A further purpose of the invention is to provide an improved carpet fastener including a snap fastener stud part and a stud securing element that serves to secure the stud part permanently against the back of the carpet in such a way that the stud protrudes from the carpet without passing through it and so that the rug may be removed without possibile disassembly of the fastener from the carpet.

Another object of the invention is to provide an improved carpet fastener that may be rigidly secured to the carpet with a minimum of penetration of the body of the rug and in such a way that the fastener securing means is substantially completely concealed by the nap of the carpet, and is substantially invisible if the rug has no nap.

Still another object of the invention is to provide a carpet fastener stud and means to attach it consisting of parts applied to opposite sides of the carpet in such a way that a substantial area of the body of the rug is clamped between the parts with the stud disposed centrally of said area so that the stud is held from lateral tilting under all conditions.

Another object of the invention is to provide a carpet fastener that serves to maintain the rug flat upon the floor by exerting a slight tension on the carpet when the fastener is in holding position.

This invention also aims to provide a stud carpet fastener designed for attachment to the carpet and formed so that the stud may be brought into the socket with facility though the fastener be not exactly aligned with the socket when entry of the stud therein is initiated.

Further objects of the invention will appear as a description thereof proceeds with reference to the accompanying drawings, in which:

Figure 1 is a perspective view of a fragment of a carpet, and the preferred form of fastener, disassembled from the carpet for purposes of clear illustration.

Figure 2 is a fragmentary plan view of the underside of a carpet provided with the improved fastener of Figure 1, the fastener being applied to the carpet.

Figure 3 is a cross-sectional view taken on the plane indicated by the line 3—3 in Figure 2, looking in the direction of the arrows.

Figure 4 is a perspective view of a modified snap fastener stud made of sheet steel that may be substituted for the wire stud forming a part of the assembly illustrated in Figures 1, 2 and 3.

Figure 5 is a fragmentary view showing the fastener stud of Figure 4 applied to the carpet.

Figure 6 is a view similar to Figure 1 showing a modified form of fastener including a sheet metal ring to secure the stud to the side of the rug to which it is applied.

Figure 7 is a view of the arrangement of Figure 6 in assembled position as seen from the underside of the carpet.

Figure 8 is a fragmentary sectional view taken on the plane indicated by the line 8—8 in Figure 7, looking in the direction of the arrows.

Figure 9 is a perspective view of a modified form of fastener stud that may be substituted for that illustrated in Figures 6, 7 and 8.

Figure 10 is a fragmentary view of the underside of a rug having the fastener of Figure 9 applied thereto.

Like reference characters indicate like parts throughout the several figures.

In the preferred embodiment of the invention illustrated in Figures 1, 2 and 3, the carpet fastener of the present invention comprises a snap fastener stud 10 and a stud securing element for the stud designated as a whole by the numeral 11.

The snap fastener stud preferably is constructed substantially in the form illustrated in Patent No. 1,679,266, granted July 31, 1928, and comprises a head 12 formed by bending the mid portion of a piece of relatively stiff wire into the form of a loop. The portions of the wire adjacent the ends of the loop are turned inwardly substantially in the plane of the loop to form arms 13 and 14 that carry respectively legs 15 and 16 that are bowed outwardly between the head 12 and the tip of the shank of the fastener that includes only the legs 15 and 16. The arrangement just described provides divergently disposed holding surfaces 17 and 18 on the legs 15 and 16, and convergently disposed guiding surfaces 19 and 20 between the point of maximum outward bowing of the legs and the tip of the shank. As illustrated in Figure 1, the legs 15 and 16 are brought into overlapped relation so as to form an entering point for the shank of the fastener.

The fastener securing part 11 comprises a sheet metallic ring 21 having a multiplicity of tongues 22 projecting away from an edge of said ring. The snap fastener stud 10 is secured to a rug, a fragment of which is designated by 23, and consists of a body 24 having a relatively deep nap 25 projecting from the normally exposed surface thereof, by causing the ring 21 to be embedded edgewise in the nap 25 and by causing the tongues 22 to penetrate the body 24. The inner diameter of the ring is larger than the external diameter of the loop 12 so that the head of the fastener and the body of the rug may enter the ring as illustrated in Figure 3. When the tongues 22 have penetrated the body 24 the head 12 may be inserted between said tongues and the tongues clinched over to surround or embrace the wire constituting the loop 12 as indicated at 23', (Figures 2 and 3). Preferably, the loop 12 with the part of the rug with which it contacts is forced into the ring 21 as shown so that no part of the fastener extends beyond the inner plane of the carpet except the protruding shank of the fastener. The snap fastener stud is thus secured fixedly against the underside of the rug or carpet with the legs 15 and 16 thereof projecting away from said side.

Fasteners are applied to the rug at points spaced along the margins thereof, in the manner just described. It will be observed that the rings 21 are substantially concealed in the nap of the carpet in view of the fact that they are applied edgewise.

A rug or carpet equipped with fasteners after the manner just described may be readily conveniently applied and removed from a metal floor 26, provided with apertures 27 for the reception of the protruding fastener studs. The floor 26 may be made entirely of metal, or it may be constructed of wood with metal plates covering openings in the wooden floor at the point at which the fasteners are positioned. In either event, the protruding studs are inserted individually in the respective perforations in the floor provided to receive them. By bringing the tips of the shanks of the studs opposite the floor perforation, it is immaterial whether the rug or carpet be positioned so that the tips of the shank of the fastener be disposed centrally of the perforations 27, because when the fastener is entered in the perforation, the shank is centered as it passes through the perforation by the convergent guiding surfaces 19 and 20, which are of substantial length as illustrated. As the shank 10 of the stud is passed through the perforation, the engagement of the converging guiding surfaces 19 and 20 with the edges of the perforation 27 not only causes a centering of the shank of the fastener in the perforation and a shifting of the rug or carpet if such is necessary, but the engagement of said converging surfaces with the edges of the perforation cause a contraction of the shank of the fastener in a manner that will be obvious, until the point of maximum width of the shank has been passed through the perforation. As the movement of the shank of the fastener through the perforation continues the divergent holding surfaces 17 and 18 engage the inner corners of the perforation in the floor 26, and as said movement of the shank of the fastener continues said divergent holding surfaces exert a pull upon the rug or carpet to which the fastener is attached, in view of the fact that in the applied position of the fastener, the legs 15 and 16 are pressed inwardly slightly toward each other from their normal position so that the arms 13 and 14 of the head of the fastener are under torsion. The legs 15 and 16, thus, in their applied position, serve not only to center the fastener within the perforation in the floor, but at the same time to draw the carpet or rug accurately in position upon the floor, tensioning it between the fasteners, and at the same time exerting a pull upon the rug tending to draw it firmly against the floor. The carpet or rug can be readily removed by withdrawing the fastener secured thereto from the floor, and can be readily replaced by again entering said studs in the perforation in the floor. The latter can be effected expeditiously and without difficulty since as above pointed out an accurate initial registry of the studs with the perforations is not required. Accordingly, the studs can be secured to the carpet in such a way that the carpet is placed under some tension between adjacent studs in the application thereof to the floor. In carpet fasteners heretofore proposed in which the stud completely fills the socket, this is impracticable because it is necessary that the studs be brought into accurate alignment with the sockets before the fastener elements can be brought into assembled relation. This is difficult of accomplishment if it is necessary to tension the rugs in order to bring about such exact registry.

Instead of the snap fastener stud constructed of wire, a stud such as illustrated in Figure 4 may be used. The fastener stud of said figure is constructed of sheet metal, such as steel, and includes a flat head 26' and a shank consisting of a pair of legs 27' and 28 bent from the plane of the blank into right angular relationship to the head 26'. The legs 27' and 28 are formed on their edges to provide holding surfaces 29 and 30 corresponding in function and mode of operation to the holding surfaces 17 and 18 of the stud supporting fastener before described. The fasteners are formed at their edges to provide guiding surfaces 31 and 32 corresponding in function and mode of operation to the guiding surfaces 19 and

20 of the fastener before described. The legs 27' and 28 are bent so that they may move past each other like the arms of a scissors, the leg 28 in Figure 4 being arranged to pass in front of the leg 27' when the shank of the stud which is formed by said legs is contracted in entering a stud in a perforation in the floor, as above described. Upon contraction of the shank of the stud, by relative movement of the legs 27' and 28, the flat head is bent and put under torsion in order to increase the flexibility of said head to such bending. A curved slit 33 may be formed therein to separate the portion of the head that carries the legs 28 and 27' from the remainder.

The head 26' is provided with a multiplicity of openings 34 arranged in position to receive the tongues 22 of the fastening rings used to secure the snap fastening stud to the carpet. The tongues 22, are passed through the openings 34, and are bent into contact with the underside of the head 26' as indicated at 35 in Figure 5. In this form of the invention the head 26' is made larger in diameter than the ring so that said head will project laterally of the tongues of said ring.

In the use of the invention illustrated in Figures 4 and 5, the same results are obtained that are secured by the use of the preferred form of the invention and said results are obtained in substantially the same way as will be obvious.

Figures 6, 7 and 8 show a further modification of the invention in which plate-like retaining means is used for securing the snap fastener stud to the rug.

In accordance with this form of the invention a further plate-like retaining element 36 is used. This element is stamped from sheet metal and is preferably of dished form as illustrated. The element is provided with a multiplicity of openings 37 positioned to receive the tongues 22 of the ring 21 before described. The element 36 is made large enough in diameter to receive the ring 21 and the portion of the carpet adjacent the ring within the dished portion. Element 36 is provided with an aperture 38 for the passage of the shank of the fastener.

Preferably, the ring 11 is first applied to the rug or carpet by embedding it in the nap of the carpet and causing the tongues 22 to penetrate the body thereof in the manner above described. The fastener is then assembled with respect to the plate 36 by passing its shank through the aperture 38 and disposing its head in the concavity therein, after which the tongues 22 of ring 11 are passed through openings 37. Said tongues are then bent in either direction as indicated at 39 (Figure 7) into contact with the under surface of the element 36 securing it firmly to the rug.

In the form of the invention illustrated in Figures 9 and 10, a sheet metal snap fastener stud such as illustrated in Figure 9 is substituted for the wire stud of Figures 6, 7 and 8. The stud of Figure 9 is constructed in the same manner as the stud illustrated in Figure 4, and like reference characters are applied to corresponding parts. Head 26' is, however, not provided with openings to enable it to receive the tongues of the ring 11, said stud being secured to the carpet by elements such as 36 in the manner fully described with reference to Figures 6, 7 and 8. In securing the stud to the rug, the fastener is assembled within the element 36 and the tongues 22 are passed through openings 37 and the tongues 38 are then bent into contact with the underside of the head 26' as indicated at 41 in Figure 10. In the form of the invention illustrated in Figures 6, 7 and 8 and in Figures 9 and 10 the fasteners may shift slightly within member 36 if necessary to aline their shanks with respect to the openings in the floor.

In the application of the rugs provided with the fastening element as above described in connection with the form of the invention illustrated in Figures 6, 7 and 8, and in connection with the form of the invention illustrated in Figures 9 and 10, the rugs are applied to the supporting structure in the manner above described with reference to the form of the invention illustrated in Figures 1, 2 and 3, and the assembly has the same important advantages particularly pointed out with respect to the form of the invention of said figures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A carpet fastener, comprising in its entirety, first, a snap fastener stud part consisting of a flat head and a resilient shank including only two legs arranged to pass each other like the arms of scissors, said legs presenting edge surfaces that diverge adjacent the head and then converge, and second, a stud securing part comprising a ring of a substantially greater diameter than the diameter of said head, said ring having a plurality of tongues formed to penetrate the body of the carpet and embrace portions of the head of said stud part.

2. A carpet fastener, comprising in its entirety, first, a snap fastener stud part consisting of a head and a resilient shank and formed from a piece of relatively stiff wire by bending a part of the wire to form a loop constituting the head, and by bending other parts to form two outwardly bowed legs, and, second, a stud securing part comprising a ring larger in diameter than said head by twice the thickness of the carpet body and having a plurality of tongues formed to penetrate the body of the carpet and to be bent around said loop in securing the stud part to the carpet.

3. A carpet fastener, comprising a snap fastener stud part including a head and a resilient shank projecting away from said head, and a stud securing part comprising an element in the form of a ring larger in diameter than said head by twice the thickness of the body of said carpet and formed to be embedded edgewise in the nap of the carpet and including a multiplicity of tongues designed to penetrate the body of the carpet and to be bent around portions of said stud part.

4. A carpet fastener, comprising a snap fastener stud part consisting of a flat head and a resilient shank including only two legs arranged to pass each other like the arms of scissors, said legs presenting edge surfaces that diverge adjacent the head and then converge, and a stud securing part comprising an element in the form of a ring having a diameter exceeding by twice the thickness of the body of said carpet the diameter of said head, said ring including a multiplicity of tongues to penetrate the body of the carpet and to be bent around the outside of said head to directly secure said stud part to said element.

5. A carpet fastener, comprising in its entirety a snap fastener stud part having a flat head, and a stud securing part comprising a ring-like element having a diameter exceeding the diameter of said head by approximately twice the thickness of the body of the carpet so that said head and the portion of the carpet to which said stud is secured may be disposed within said ring, and means to secure said ring and stud to opposite sides of said rug with said head substantially within said ring whereby the thickness of the fastener is minimized.

6. A carpet fastener, comprising in its entirety a one-piece wire snap fastener stud part consisting of a head in the form of a loop constructed from a part of the wire and a shank consisting of two outwardly bowed legs formed from the remainder of said wire, and a stud securing part comprising a ring having tongues to penetrate the carpet depending therefrom, said ring having an inside diameter substantially equal to the external diameter of said loop plus twice the thickness of the body of said carpet, whereby the ends of said tongues may be brought around the outside of said head into securing engagement with said loop after penetration of said carpet with the loop nested in said ring.

BION C. PLACE.